3,450,546
TRANSPARENT GLASS-CERAMIC ARTICLES AND METHOD FOR PRODUCING
Guy E. Stong, Elmira, N.Y., assignor to Corning Glass Works, Corning, N.Y., a corporation of New York
No Drawing. Filed May 26, 1966, Ser. No. 553,058
Int. Cl. C03c 3/10; C04b 35/64
U.S. Cl. 106—39        5 Claims

ABSTRACT OF THE DISCLOSURE

This invention relates to transparent sintered glass-ceramic articles, having alpha-cordierite as the principal crystalline phase, produced by mixing particulate glasses consisting essentially of from between 48–60% $SiO_2$, 23–36% $Al_2O_3$, and 12–18% MgO with an organic binder and then subjecting the mixture to a particular heat treatment.

---

In Patent No. 3,222,150 is described a method for making glass-to-metal seals where the glass elements are of such complex shapes that conventional glass-forming techniques, based upon the working from a glass melt, are not feasible for their production. These glass elements are produced by sintering shapes formed from powdered glass to the desired configuration by extruding, casting, pressing, or some other conventional method of forming articles from fine powders. The glass element may be simultaneously fused to the metal element during the sintering step or the sintered glass element may subsequently be heated to fuse it to the metal element. That patent disclosed that transparent sintered glass elements could be manufactured where the sintering step was undertaken in a substantial vacuum. One practical advantage lying in the transparency of the glass elements was the ability to visually inspect the seal to the metal element for flaws.

It can be appreciated that the physical properties of glasses, in general, limit their usefulness. This is especially true with respect to mechanical strength and refractoriness or use temperature, i.e., the maximum temperature at which an article can be used without substantial structural change therein. Hence, the strength of conventional glasses, as measured in terms of modulus of rupture, ranges about 5000–8000 p.s.i., and the softening points of the great majority of glasses are less than 900° C. The recent development of a new field of ceramics, viz, glass-ceramics, has provided a new type of product which combines the properties of ceramic, or crystalline, bodies with those of glasses such that the resulting article possesses physical and chemical properties different from its individual ceramic and glass components.

The basic patent in the field of glass-ceramics, Patent No. 2,920,971, describes in considerable detail the production techniques for manufacturing such products as well as the theoretical concepts deemed to control the mechanism involved in the development of such products. In brief, glass-ceramics are obtained through the crystallization of a glass body in situ brought about by heat treating a glass body of a proper composition in a carefully controlled manner. In other words, a glass body is first formed from a suitable melt and this glass body is then heat treated in accordance with a predetermined time-temperature schedule to cause the glass to crystallize in situ. The resultant body is composed of a myriad of fine-grained crystals of substantially uniform size and homogeneously dispersed in a glassy matrix, the crystal phase comprising the predominant portion of the body. Since the body is highly crystalline, the physical properties thereof are more closely akin to those of the crystal phase than to those of the base glass.

It has been appreciated that the development of a transparent sintered body of glass-ceramic material would be of great use in certain applications especially in the electrical and electronic fields. Such products should have good electrical properties, high strength, and be able to withstand high temperatures while maintaining physical integrity. Patent No. 2,920,971 envisions the forming of sintered glass-ceramic articles but the disclosure there contemplates mixing powdered glass with a highly refractory material, such as clay or $Al_2O_3$, and then sintering the mixture. There is no description of any method of, or a composition for, the production of an essentially transparent body made by the sintering of thermally crystallizable glass powders.

Therefore, the principal object of this invention is to provide an essentially transparent, sintered glass-ceramic body which will maintain its transparency at high use temperatures.

Another object of this invention is to provide a method for making an essentially transparent, sintered glass-ceramic body which can be practiced utilizing modifications of techniques and apparatus known to the sintering art.

I have discovered these objects can be attained through the sintering and subsequent heat treatment of powdered glasses having compositions within a narrow range of the $MgO$-$Al_2O_3$-$SiO_2$ field, viz, about 48–60% $SiO_2$, 23–36% $Al_2O_3$, and 12–18% MgO. In its broadest aspects, my invention contemplates admixing an organic binder or forming aid with powdered glass of the abovedescribed composition and then forming a body of desired dimensions therefrom by employing conventional forming means. The body is thereafter heated in an oxidizing atmosphere below the sintering temperature to completely remove the organic material. Subsequently, the body is sintered in a surrounding atmosphere having a pressure less than 1 mm. of mercury. Finally, the sintered body is heated to a temperature higher than that utilized for the sintering step to cause the glass to crystallize in situ. The specific compositions and rigidly-defined heat treatments result in the formation of an essentially transparent, sintered glass-ceramic body wherein alpha-cordierite constitutes the principal crystal phase.

Defining the process of the invention in more specific terms, a batch for the desired glass is compounded, fused together at a sufficiently high temperature (about 1500°–1600° C.) to yield a homogeneous melt, and the melt then cooled to a glass. Frequently the melt is poured into water to cause it to break up into many small particles of glass. In any event, the glass is pulverized, usually through ballmilling, to a very fine particle size, normally at least fine enough to pass through a 400 Tyler mesh screen (a particle size of less than 44 microns).

These finely-divided glass particles are mixed with a small amount of organic binder or forming aid, generally about 0.5–10% by weight of the total mixture, and thereafter formed into shapes having a desired configuration. These shapes are then heated in an oxidizing atmosphere (commonly air) to burn out the organic binder or forming aid. This burnout is accomplished at temperatures ranging about 500°–800° C. for a time of at least one hour and, preferably, for several hours to insure complete removal of the organic material. A temperature of at least about 500° C. has been found to be required to completely remove the organic material. Higher temperatures hasten the burnout of the organic material but the use of temperatures above 800° C. hazards a tendency of the glass to sinter, particularly on the surface, thereby precluding the complete removal of the organic material.

After volatilization of the organic material, the formed shapes are placed in a vacuum chamber and the chamber evacuated to a pressure of 1 mm. of mercury or less. The chamber is then heated to the sintering temperature of the glass and maintained there for a relatively brief period of time. The sintering range for a glass is defined as the range of temperatures at which the viscosity of the glass is between $10^6$–$10^8$ poises (about 850°–1000° C. for the glasses of this invention). The limits of this range are rather strict since sintering will not occur when the glass has a viscosity greater than $10^8$ poises and extensive distortion or slumping of the formed shape will occur when the viscosity of the glass is less than $10^6$ poises. Another factor militating against a long hold within the sintering range is the tendency of these materials to begin to crystallize, i.e., to be converted to a glass-ceramic body. Such incipient crystallization can disturb the good transparency of the final product when it is crystallized in the carefully controlled manner set out hereinafter. Therefore, the sintering time at the higher end of the sintering range should preferably not exceed about 10 minutes and the dwell period at the lower end of the range should preferably not be longer than about 1 hour. After completion of the sintering, the vacuum is released and the unitary structure resulting therefrom is usually removed from the vacuum chamber for visual inspection.

The sintered shapes are then placed in a furnace and heated to temperatures between about 1200°–1425° C. and maintained within that temperature range for a sufficient length of time to crystallize the glass shape in situ. Although the glass compositions of this invention contain no nucleating agent as such, it is believed that the crystallization occurring herein takes place in substantial accord with the general hypothesis that crystallization is preceded by nucleation. Hence, it is assumed that as the glass shapes are heated to the crystallization range, a nucleation zone is first encountered at a lower temperature. These nuclei provide sites for the later growth of crystals thereon. Experience has shown that a more uniformly fine-grained crystal structure will be developed within a glass-ceramic body where adequate nucleation has preceded the crystallization step. I have learned that the transparency of the crystallized products of my invention is affected by the size of the crystals developed therein. Therefore, it is often useful to hold the sintered shape for several hours (about 4–24 hours) within the temperature range of about 750°–950° C. to insure good nucleation prior to heating to the crystallization range.

After the nucleation step, the temperature of the shape is raised to about 1200°–1425° C. (preferably about 1300°–1400° C.) and maintained thereat for a sufficient time to cause the glass to become highly crystalline, i.e., at least 50% by weight crystalline and, commonly, more than 75% by weight crystalline. The crystallization process is, like the nucleation step, a function of both time and temperature. Generally, a period of about ½–6 hours within the crystallization range insures a high degree of crystallinity. Longer treatments do not deleteriously affect the product but are usually not economically desirable, since the increased crystallization resulting from such longer heat treatments is usually slight.

verted to the desired oxide composition in the proper proportions.

I have discovered that good transparency in the final product is closely dependent upon the composition of the base glass. Therefore, not only must the quantities of MgO, $Al_2O_3$, and $SiO_2$ be maintained within the above-circumscribed ranges but the addition of other oxides thereto must be minimized. Thus, the total of extraneous oxides ought not to exceed 10% by weight and, preferably, should be held less than 5% by weight in order to insure a transparent product. The following oxides have been found compatible with the base glass composition and, when present in small amounts, may be beneficial as melting aids, as improving the clarity of the product, (particularly the alkaline earth oxides), as improving the chemical durability of the product, and the like: CaO, SrO, BaO, $La_2O_3$, PbO, $P_2O_5$, ZnO, and $B_2O_3$.

TABLE I

|  | 1 | 2 | 3 | 4 | 5 |
|---|---|---|---|---|---|
| $SiO_2$ | 56.7 | 55.9 | 54.3 | 52.4 | 50.8 |
| $Al_2O_3$ | 25.2 | 27.7 | 29.7 | 31.8 | 34.5 |
| MgO | 14.6 | 14.4 | 13.9 | 13.8 | 13.5 |
| CaO | 3.5 |  | 0.1 |  | 0.2 |
| BaO |  | 2.0 | 2.0 | 2.0 | 0.6 |
| SrO |  |  |  |  | 0.4 |

Each of the glasses of Table I was melted in open crucibles and the melt poured into cold tap water. The resulting glass particles were further ballmilled so that all passed through a 400 Tyler mesh screen and were then mixed with about 2% by weight of a polyethylene glycol having a molecular weight of about 20,000 as an organic binder. The mixture was thereafter pressed into discs about 1 cm. in diameter and about 1 mm. thick. The discs were then placed in a burn-out furnace and held overnight (about 16 hours) at 550°–600° C., air being allowed to circulate within the furnace during this burn-out operation. The discs were then introduced into a vacuum retort, the retort evacuated to a pressure of 0.5–1 micron of mercury, and the retort heated at about 800° C./hour to 960°–1000° C. The discs were held within that temperature range for about 15 minutes, the heat to the retort cut off, and air blown on the retort to give rapid cooling to about 300° C. where the vacuum was released.

The sintered discs were finally placed in a furnace and heated in accordance with the schedules recorded in Table II. A heating rate of 300° C./hour was utilized except where noted otherwise and a cooling rate of 300° C./hour was employed. Neither the heating nor cooling rates appeared to be critical to the achievement of good crystallization. Too rapid temperature changes, of course, hazard breakage of the articles as is well-recognized in the ceramic and glass arts.

Table II also records the crystal phases present in the bodies as determined by X-ray diffraction analysis, the coefficient of thermal expansion between 25–300° C. ($\times 10^{-7}$/°C.), and the modulus of rupture (p.s.i.) of the various products.

TABLE II

| Ex. No. | Heat treating schedule | Crystal phases | Expansion | Modulus of rupture |
|---|---|---|---|---|
| 1 | Hold at 1,360° C. for 1 hr. | Alpha-cordierite | 16 | 12,400 |
| 2 | do | do |  |  |
| 3 | do | do |  |  |
| 4 | do | do |  |  |
| 5 | Hold at 800° C. for 12 hrs., 800°–900° C. at 6° C./hour, hold at 900° C. for 12 hrs., 900°–1,410° C. at 600° C./hr., hold at 1,410° C. for 1 hr., cool at 600° C./hour. | do | 8.2 | 12,300 |

Table I sets forth several glasses which are suitable for the practice of my invention. The compositions thereof are recorded in weight percent on the oxide basis as calculated from the batch ingredients. The batch constituents may comprise any materials, either oxides or other compounds, which, on being melted together, are con- The crystal content of these bodies has been determined to be well over 50% by weight, this factor being dependent upon the extent to which the components are adaptable to the formation of crytsal phases. The crystals, themselves, are very fine-grained, i.e., substantially all being smaller than 1 micron in diameter. It is this small crystal size coupled with the relatively close match in index of refraction between the crystals and the residual glass which imparts transparency to the bodies. Example No. 1 is my preferred composition due to the clarity of the crystallized sintered products which can be fabricated therefrom. Since the crystallization temperatures for these bodies are very high, it can readily be appreciated that such bodies can be used in service applications where high refractoriness is demanded.

I claim:

1. An essentially transparent, sintered glass-ceramic article wherein homogeneously dispersed alpha-cordierite crystals constitute the principal crystal phase, said glass-ceramic article consisting essentially, by weight on the oxide basis as calculated from the batch, of about 48–60% $SiO_2$, 23–36% $Al_2O_3$, and 12–18% MgO, the total $SiO_2$, $Al_2O_3$, and MgO constituting at least 95% by weight of the article and up to 5% by total weight of at least one member selected from the group consisting of CaO, SrO, BaO, $La_2O_3$, PbO, $P_2O_5$, ZnO, and $B_2O_3$.

2. The article as recited in claim 1, wherein the crystals are less than 1 micron in diameter.

3. A method for producing an essentially transparent sintered glass-ceramic body wherein homogeneously dispersed alpha-cordierite crystals constitute the principal crystal phase, which comprises the steps of
   (a) mixing together finely-divided glass particles in an organic binder, said glass particles consisting essentially, by weight on the oxide basis as calculated from the batch, of about 48–60% $SiO_2$, 23–36% $Al_2O_3$, and 12–18% MgO, total $SiO_2$, $Al_2O_3$, and MgO constituting at least 95% by weight of the glass and up to 5% by weight total of at least one member selected from the group consisting of CaO, SrO, BaO, $La_2O_3$, PbO, $P_2O_5$, ZnO, $B_2O_3$;
   (b) shaping the mixture to a body of the desired configuration;
   (c) heating the body in an oxidizing atmosphere to a temperature between about 500° C.–800° C. for at least one hour to completely burn out the organic binder;
   (d) exposing said body to a temperature to within the range in which the viscosity of the glass is between $10^6$–$10^8$ poises in a surrounding atmosphere having a pressure less than 1 millimeter of mercury for a period of time varying about 10 minutes at the upper end of the temperature range to about one hour at the lower end thereof to sinter the body to a unitary structure; and, finally,
   (e) exposing said body to a temperature between about 1200° C.–1425° C. for at least one-half hour to cause the glass to crystallize in situ.

4. The method according to claim 3 wherein prior to the crystallization step the sintered body is exposed to a temperature between about 750°–950° C. for about 4–24 hours.

5. The method according to claim 4 wherein the crystallization step comprises exposing said body to a temperature to between about 1300°–1400° C. for between about ½–6 hours.

References Cited

UNITED STATES PATENTS 3,225,132   12/1965   Baas et al. _____ 174—151
3,365,314   1/1968    Sack _____ 106—39

DONALL H. SYLVESTER, Primary Examiner.

J. H. HARMAN, Assistant Examiner.

U.S. Cl. X.R.

65—18, 33; 106—47